Nov. 14, 1939.　　　　　A. MILLER　　　　　2,180,160
METHOD OF AND MEANS FOR ELIMINATING DISTORTION
Filed March 26, 1937　　　5 Sheets-Sheet 1
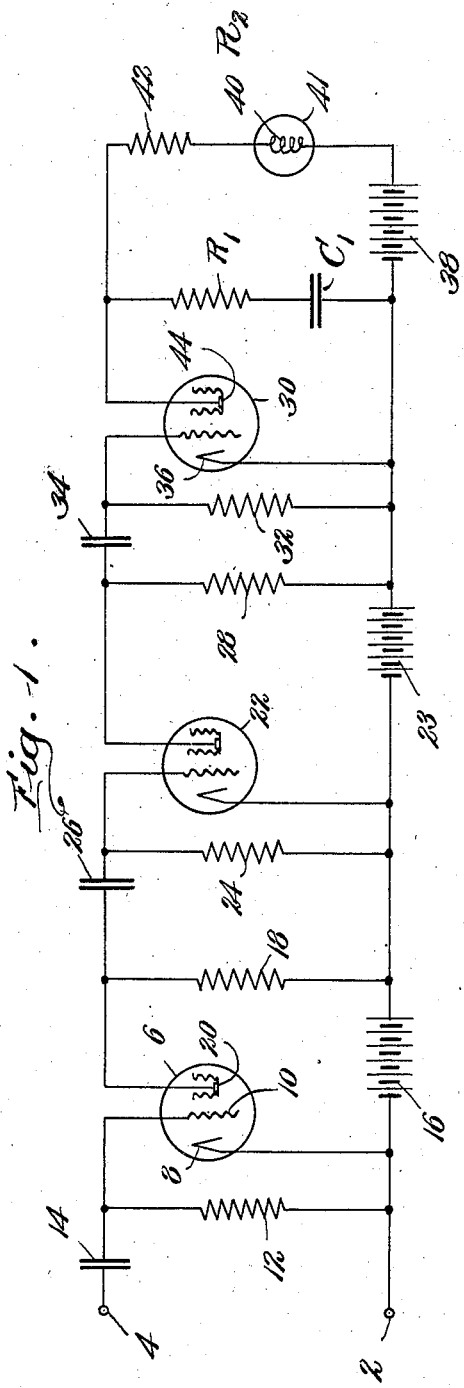
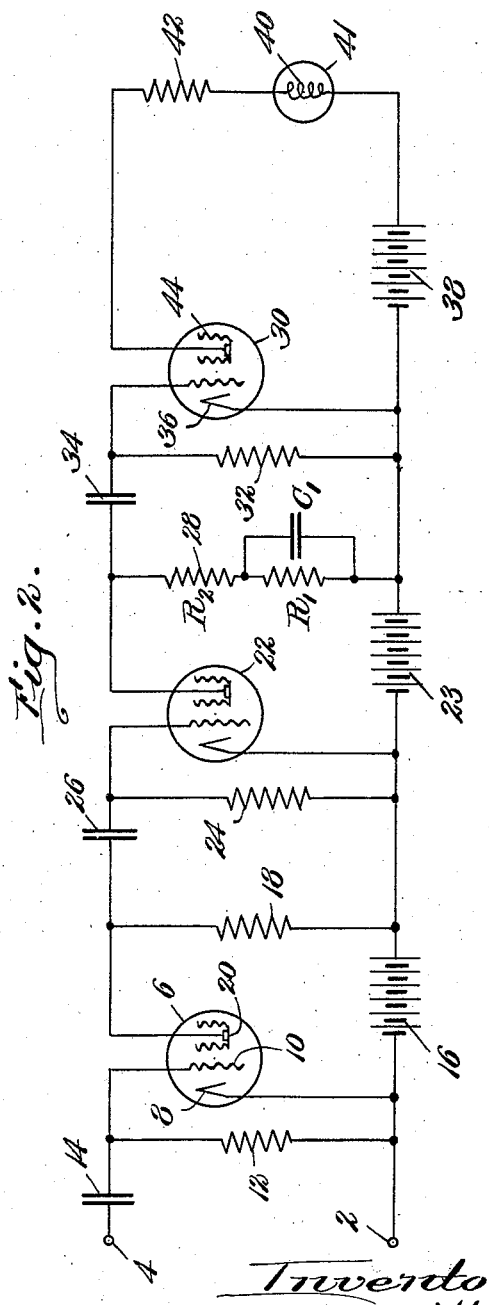
Inventor.
Arthur Miller Nov. 14, 1939.　　　　A. MILLER　　　　2,180,160
METHOD OF AND MEANS FOR ELIMINATING DISTORTION
Filed March 26, 1937　　　5 Sheets-Sheet 2
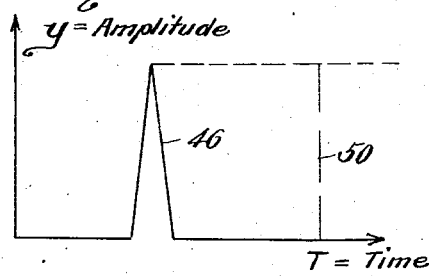
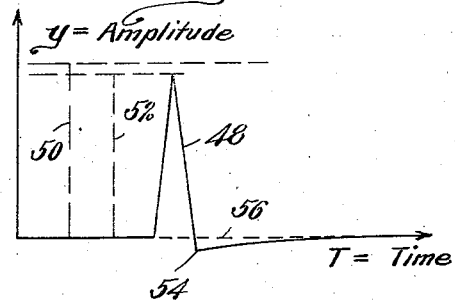
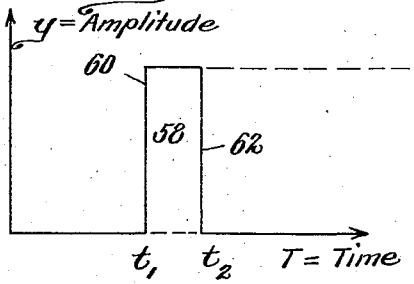
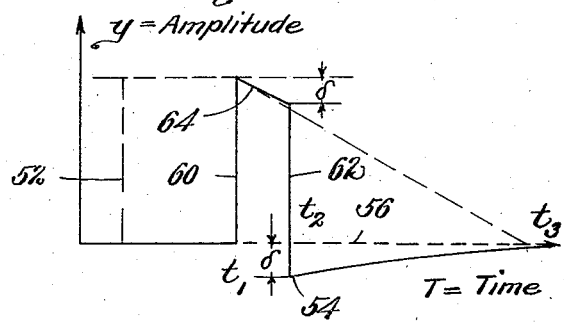
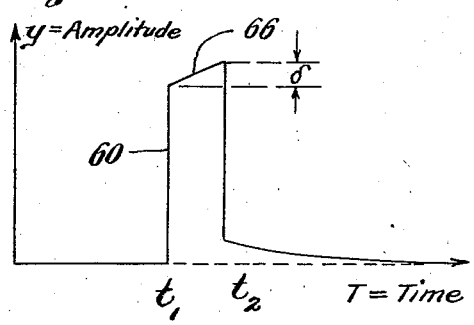
Inventor.
Arthur Miller Y = Amplitude
T = Time Inventor.
Arthur Miller

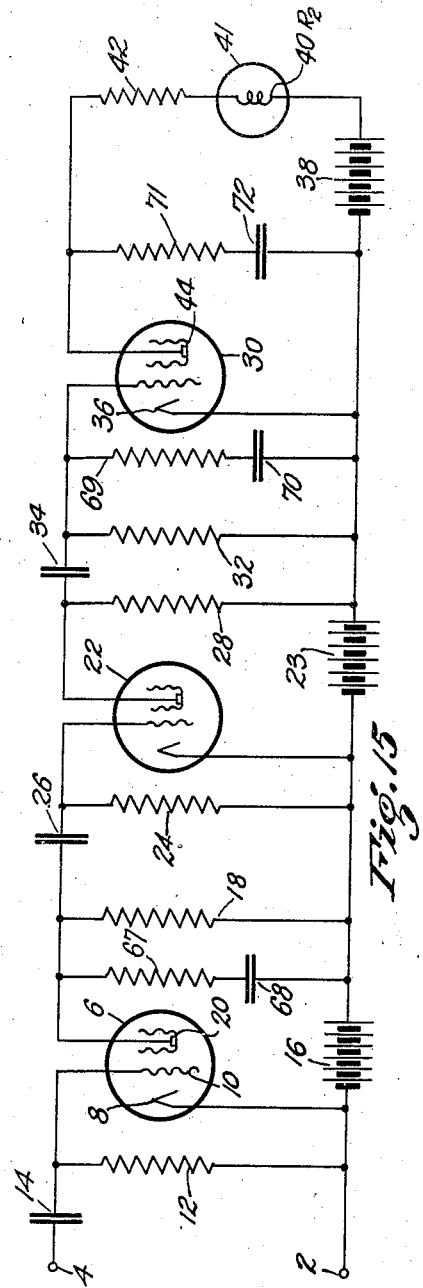
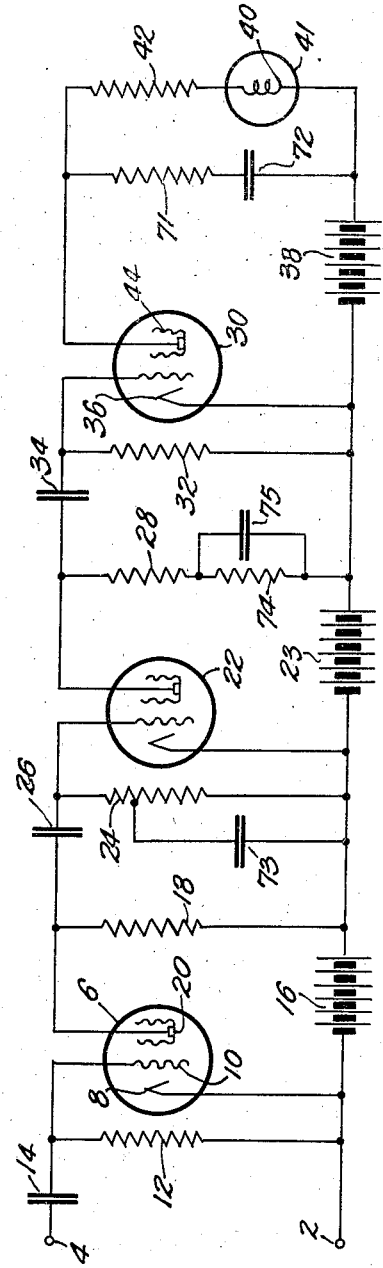

Patented Nov. 14, 1939

2,180,160

UNITED STATES PATENT OFFICE 2,180,160

METHOD OF AND MEANS FOR ELIMINATING DISTORTION

Arthur Miller, Chelsea, Mass., assignor to Sanborn Company, Cambridge, Mass., a corporation of Massachusetts Application March 26, 1937, Serial No. 133,128

11 Claims. (Cl. 179—171)

The present invention relates to methods of and means for eliminating wave-form distortion, and more particularly such distortion as is introduced into an electric circuit by the presence of series coupling condensers. Though the invention has general application, it will be described herein in connection with the distortion introduced into an electrocardiograph system of the amplifier type.

Electrocardiographs of the above-described character are commonly provided with electrodes that are positioned over various parts of a human body and through the medium of which the electrical impulses associated with cardiac activity are impressed upon the input of the amplifier and, after amplification, are transmitted to an oscillograph. With the aid of the oscillograph, a record may be produced corresponding to the amplified electric currents or potentials.

From a more specific aspect, therefore, this invention relates to the recording of electric currents or potentials by oscillographic means, and particularly to the recording of potentials that are associated with the action of the heart.

Electrocardiographs of the above-mentioned amplifier type usually embody several resistance-capacitance-coupled amplifier stages coupled by series condensers. An additional series condenser or condensers may be employed for eliminating the direct currents introduced by the so-called skin effects, and a blocking condenser may be inserted directly in series with the oscillograph instrument. The accumulation of electric charges on these condensers produces distortion effects in the oscillograph record.

Figure 8:
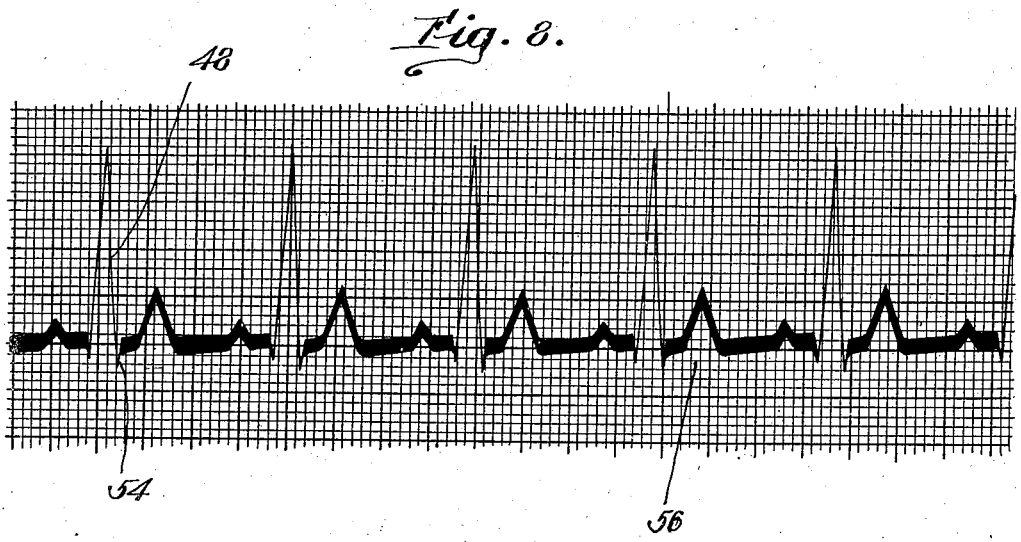
Figure 9:
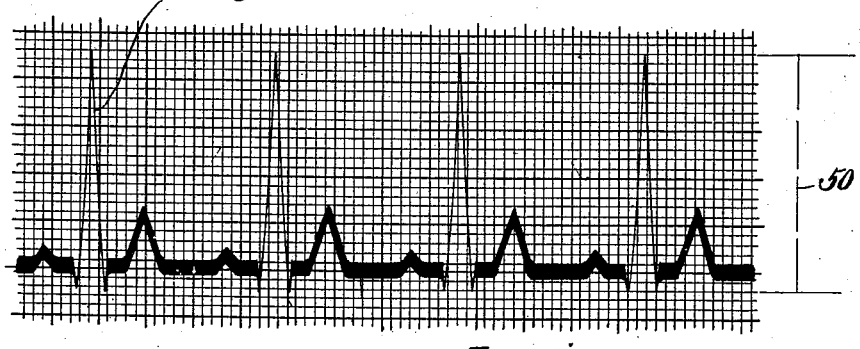
Figure 10:
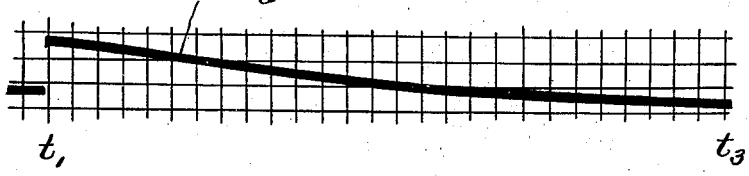

The invention will now be described in connection with the accompanying drawings, in which Fig. 1 is a simplified diagrammatic view of an electrocardiograph circuit embodying the present invention; Fig. 2 is a similar view of a modification; Figs. 3 to 7, inclusive, are explanatory diagrams; Fig. 8 is an actual cardiogram produced in accordance with present-day electrocardiographs of the above-described character; Fig. 9 is a corresponding view of a cardiogram produced in accordance with the present invention; Fig. 10 is a decay curve illustrating the effect produced by a suddenly introduced constant voltage; Figs. 11 to 14 are explanatory diagrams; and Figs. 15 and 16 are views similar to Figs. 1 and 2 of modifications.

Electrocardiographs are usually provided with three electrodes, two of which are shown at 2 and 4, that are connected, in pairs, to various parts of the human body. The electrodes are connected in the input circuit of a vacuum-tube amplifier 6, between the filament 8 and the grid 10, in parallel with a resistance 12. A series condenser 14 may be inserted between the electrode 4 and the grid 10 to filter out the direct-current skin effects. The output circuit of the tube 6 is shown extending from the filament 8, through a plate battery 16 and a resistance 18, to the plate 20. The tube 6 is shown coupled to another tube 22 of the same character as the tube 6, in the input circuit of which is disposed a resistance 24. The resistances 18 and 24 are separated by a series coupling condenser 26, as is customary with resistance-capacity-coupled amplifiers. The output circuit of the second amplifier tube 22 is provided with a plate battery 23 and a resistance 28, and the input circuit of the next-following tube 30 is provided with a resistance 32, the resistances 28 and 32 being similarly separated by a similar series condenser 34. As many stages of amplification as desired may be coupled in this manner, the output circuit of the last, or output, tube 30 of the amplifier being shown extending from the filament 36 through the plate battery 38, a coil 40 for actuating a galvanometer 41, and a resistance 42, to the plate 44. The resistance 42 is assumed to represent all the resistance that may be present in the output circuit of the tube 30, including the galvanometer coil resistance and any external resistance added thereto. It will be understood that the diagrammatic showing is greatly simplified, for clearness. For example, each of the tubes 6, 22 and 30 is shown as a screen-grid tube, though the connections for the screen grids are omitted. The filament-heating batteries are not shown for a similar reason; these filaments may be connected to a single battery or other source of power, and the plate batteries 16, 23 and 38 may likewise be combined into a single source of power.

The above-described distortion is introduced by each of the condensers 14, 26 and 34.

The cardiac potentials applied to the terminals 2 and 4 consist of a succession of impulses. To interpret the record made by the galvanometer 41 of these impulses, it is necessary to know both the location of the base line about which the potential fluctuates and the amplitude of the impulses. The base line is indicated in Figs. 3 to 8 as the axis of abscissae to represent time, and amplitudes are shown measured along the ordinate.

In Fig. 3, there is illustrated a theoretically ideal triangular signal impulse 46, similar to the QRS complex of the cardiac cycle. In Fig. 4, on the other hand, the corresponding recorded signal 48 is shown considerably distorted. The theoretically correct amplitude is shown at 50. The recorded amplitude is shown at 52, somewhat smaller than the amplitude shown at 50. The effect of the series condensers 14, 26 and 34 in the recording circuits is, not only to reduce the amplitude of the recorded wave, but also to produce a deflection, as indicated at 54, below the original base line 56 after the passage of the impulse. This deflection is sometimes of a serious nature, as it may, at times, be misconstrued as an additional impulse produced by the heart. Such distortion effects have been an unavoidable concomitant of circuits using capacitance coupling.

It will be advantageous to discuss the distortion effect in terms of a voltage or a current impulse, the true theoretical variation of which, with time, is rectangular in shape, such as the input signal 58, illustrated in Fig. 5. The input signal rises vertically upward, as shown at 60, at time $t_1$, and falls vertically downward, as shown at 62, at time $t_2$, after a short time interval. During that time interval between $t_1$ and $t_2$, the theoretical impulse has a constant amplitude. The corresponding recorded impulse, shown in Fig. 6, however, though initially of the same amplitude as the theoretical impulse, at the initial time $t_1$, shows a decaying amplitude, with a total drop, at the time $t_2$, having a value marked $\delta$. As a result, when the impulse becomes zero, therefore, the record shows an excursion below the true base line equal to this drop $\delta$.

If this drop $\delta$ be taken as a measure of the distortion, then, for short impulses, it is obvious that the distortion is largely dependent upon the initial downward slope of the line 64 which the record shows when a constant voltage or current is suddenly applied to the recording apparatus. This downward slope, or decay, in turn, can be measured by drawing a tangent to the recorded curve, at the point where the voltage or current was applied, and extending the tangent line until it intersects the base line at $t_3$, as shown in Fig. 6. The line 64 applies to the decay before correction; the curve 65 (see particularly Fig. 10) is corrected. The time interval between $t_3$ and $t_1$ will be defined here as the time constant $T_0$ of the recording circuit. A slow decay and small distortion corresponds to a large time constant, while a rapid decay and greater distortion corresponds to a small time constant.

To keep the distortion small, the present practice is so to proportion the condensers and associated circuits that this time constant shall be large. There are, however, practical difficulties involved in increasing this time constant. For example, as the time constant is increased, ease of operation is reduced, because of the length of time required for the apparatus to reach operating stability after adjustments are made, or switching operations performed.

According to a principle underlying this invention, a distortion-correcting network is inserted into the recording circuits of such nature as to reduce the distortion, without changing the time constant, or decay, inherent in the recording circuit prior to the inclusion of the correcting network. In this way, the time required for the apparatus to reach operating stability is not lengthened. The accuracy of reproduction of a slow-decay circuit is thus retained without sacrificing the operating advantages of a rapid-decay circuit.

The characteristics of this distortion-correcting network should be such that, if the rest of the circuit be hypothetically assumed to produce no distortion, then the correcting network itself should introduce distortion inverse to that which it is intended to correct. The impulse of the rectangular wave form of Fig. 5, for example, would be distorted in a direction opposite to the direction indicated at 64 in Fig. 6, as shown at 66 in Fig. 7.

If the tendency of the corrective network to record the constant voltage as a rising voltage balances the tendency of the rest of the circuit to record the constant voltage as a decaying voltage, then the distortion is cancelled out.

It is not, of course, possible, in general, to find a physically realizable network which will cancel the distortion perfectly, but it is possible to approach such cancellation, and the approximation may be very close indeed for short-time intervals. It so happens that individual cardiac impulses are of such short duration as to make distortion correction for electrocardiography entirely practicable.

One such corrective network which has been found very satisfactory is shown in the output circuit of the last tube 30 in Fig. 1, where a correcting resistance $R_1$ and a correcting condenser $C_1$, connected in series, are shown connected in parallel to the resistance 42 and the galvanometer coil 40.

Let it be assumed that the internal plate impedance of the output tube 30 of the amplifier is large compared to $R_2$, the total resistance of the galvanometer plus any resistance which may be added in series thereto.

Let $T_0$ represent the time constant of the amplifier with the resistance $R_1$ and the condenser $C_1$ left out, and let $T_c = R_1 C_1$, where $T_c$ is the time constant of the corrective network. It is approximately equal to the time interval over which the corrective network has some effect. For electrocardiography, and with an amplifier whose time constant $T_0$ equals 1.5 seconds, it has been found satisfactory to set $T_c$ at .25 second.

For exact initial correction, that is, no initial decay, the following equations, as will presently be shown, must be satisfied:

$$R_1 = R_2 \left( \frac{T_o}{T_c} - 1 \right) \quad (1)$$

$$C_1 = \frac{T_c}{R_1} \quad (2)$$

Having chosen $T_c$, and knowing $T_0$, the time constant of the circuit to be corrected, and $R_2$, the galvanometer circuit resistance, Equations 1 and 2 define $R_1$ and $C_1$ uniquely.

For the example cited here:

$R_2 = 2,000$ ohms
$T_0 = 1.5$ seconds
$T_c = .25$ second
$R_1 = 10,000$ ohms
$C_1 = 25$ microfarads Other correcting networks will suggest themselves to persons skilled in the art, such, for example, as the one shown in Fig. 2, which applies to a correcting network inserted in the plate circuit of some intermediate stage in a vacuum-tube amplifier.

In this case, the resistance 28, for example, may be divided into two parts $R_1$ and $R_2$, the former shunted by the condenser $C_1$. The corrective network may be applied in the plate or the grid circuit or circuits of any amplifier stage or stages.

In Fig. 15, for example, a corrective network comprising a resistance 67 and condenser 68 is shunted across the plate circuit of the first stage of the amplifier, a second corrective network comprising a resistance 69 and condenser 70 is shunted across the grid circuit of the third stage of the amplifier, while a third corrective network comprising a resistance 71 and condenser 72 is shunted across the output circuit of the amplifier.

In Fig. 16, a corrective network comprising a condenser 73 is shunted across a portion of the grid-cathode impedance 24 of the second stage of the amplifier, a second corrective network comprising the condenser 75 is shunted across a portion of the plate-cathode impedance 26 and 74 of the second stage of the amplifier, while a third corrective network comprising the resistance 71 and condenser 72 is shunted across the output circuit of the amplifier.

In these cases, too, as in other cases within the scope of the invention, the characteristics of the corrective network are such that it reproduces a suddenly applied constant voltage as a rising voltage whose initial upward slope, illustrated by the line 66, exactly or approximately equals the initial downward slope, illustrated by the line 64, with which the circuit to be corrected reproduces the same suddenly applied voltage.

The initial slopes will be exactly equal if the circuit parameters are so adjusted that the sudden application of a constant voltage to the input of the corrected amplifier, at the terminals 2, 4, results in a deflection of the recording device or indicator 40 in the output circuit of the output amplifier 30 of such nature that the initial decay is zero.

Figs. 3 to 7, as before stated, are diagrammatic. Figs. 8 and 9 illustrate actual cardiograms.

In Fig. 8, there is illustrated a cardiogram produced without the aid of the present invention. The time constant $T_o$ is 1.5 seconds. The triangular impulses, corresponding to the impulses 48 of Fig. 4, are similarly numbered. The drop 54, after each triangular impulse, is clearly indicated, and the graph is shown sloping gradually upward, toward the right.

In Fig. 9, on the other hand, the corresponding cardiogram, produced by the same circuit after correction in accordance with the present invention, shows the theoretical perfection of Fig. 3.

The decay curve of Fig. 10 clearly shows the initial flattening of the curve after a sudden application of a constant voltage to the corrected circuit.

A further advantage which this type of correction offers is an improvement in the ease and precision of standardization of an electrocardiograph making us of it. The accepted method of standardizing such an instrument consists of suddenly applying a known potential of one millivolt to the input of the instrument, and adjusting the sensitivity until the application of this potential produces a standard deflection of the recording beam or shadow of one centimeter on the camera face or viewing screen. If the electrocardiograph circuit contains series condensers, then the deflection decays immediately after the application of the calibrating potential, so that the operator must guess at the maximum amplitude of the beam deflection. With this corrective network, however, the initial decay is zero, so that the beam deflection is constant for a short time interval, thus allowing a more accurate observation of the amplitude of the deflection.

It is now in order to derive the above equations.

Figure 11:
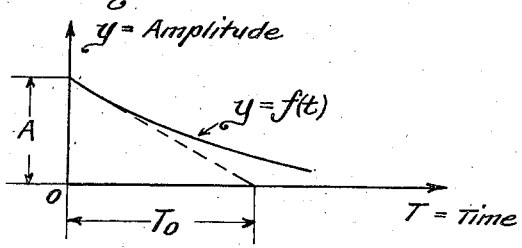

Without the corrective network, the response to a suddenly applied constant voltage of a circuit containing series-coupling condensers is some such decaying curve as is shown in Fig. 11. Regardless of the exact shape of this curve, it may be expanded into a series which will be valid for a short interval of time after $t=0$. This series is $$y = f(t) = A\left[1 - \left(\frac{1}{T_o}\right)t + \ldots\right] \quad (3)$$

Figure 12:
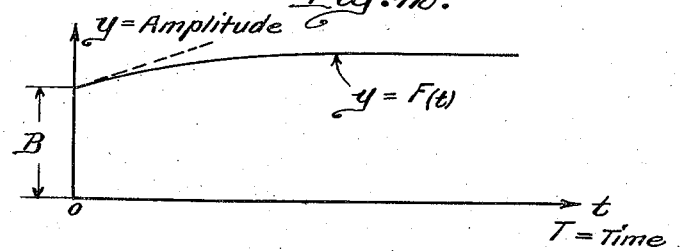

Considering the corrective network alone, its response to a suddenly impressed constant voltage is shown in Fig. 12. For small $t$, this may be expressed as $$y = F(t) = B[1 + \sigma t + \ldots] \quad (4)$$

The principle of this invention is to so design the corrective network that the following relationship holds:

$$\sigma = \frac{1}{T_o} \quad (5)$$

Figure 13:
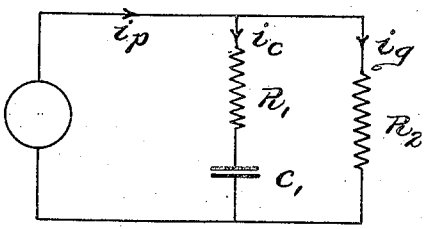

In Fig. 13, it is assumed that the source internal impedance is high compared to $R_2$, so that it acts substantially as a constant-current source. Then:

$$i_p = i_c + i_o \quad (6)$$

$$i_c = i_p - i_o \quad (30)$$

$$R_2 i_o = R_1 i_c + \frac{1}{C_1}\int i_c dt \quad (7)$$

$$= (i_p - i_o)\left(R_1 + \frac{1}{C_1}\int dt\right) \quad (8)$$

where $i_p$ is a constant current of amplitude $I_0$ suddenly impressed at $t=0$.

The solution of Equation 8 and any further differential equations will be carried out by the Laplacian Transform Method. (See Eschbach: Handbook of Engineering Fundamentals, page 2–108, and Campbell and Foster: Fourier Integrals for Practical Application, Bell Telephone System Monograph B–584.)

Let the transforms of the currents be, respectively, $$\left.\begin{array}{l}L[i_p] = I_p \\ L[i_c] = I_c \\ L[i_o] = I_o\end{array}\right\} \quad (9)$$

Transforming equation (8) to a function of the complex variable $s$, $$R_2 I_o = [I_p - I_o]\left[R_1 + \frac{1}{C_1 s}\right] \quad (10)$$

but, for a constant current applied at $t=0$:

$$I_p = \frac{I_o}{s} \quad (11)$$

Therefore, $$R_2 I_o = \left[\frac{I_o}{s} - I_o\right]\left[R_1 + \frac{1}{C_1 s}\right] \quad (12)$$

$$I_o = \frac{\frac{I_o}{s}\left[R_1 + \frac{1}{C_1 s}\right]}{R_2 + R_1 + \frac{1}{C_1 s}} \quad (13)$$

Letting $$R_2 + R_1 = R_e, \quad (14)$$

$$I_o = \frac{I_o R_1}{R_e}\frac{1}{s + \frac{1}{R_e C_1}} + \frac{I_o}{R_e C_1}\frac{1}{s\left(s + \frac{1}{R_e C_1}\right)} \quad (15)$$

Inverting (15) to obtain $i_c$ as a function of time. Inverting, $$i_c = \frac{I_o R_1}{R_o} \epsilon^{-\frac{t}{R_o C_1}} - \frac{1}{R_o C_1}\left[\frac{\epsilon^{\frac{t}{R_o C_1}} - 1}{\frac{1}{R_o C_1}}\right] \quad (16)$$

$$i_c = \frac{I_o R_1}{R_o}\left[\epsilon^{-\frac{t}{R_o C_1}} - \frac{R_o}{R_1}\left(\epsilon^{-\frac{t}{R_o C_1}} - 1\right)\right] \quad (17)$$

for small $t$, $$\epsilon^{-\frac{t}{R_o C_1}} = 1 - \frac{t}{R_o C_1} + \ldots \quad (18)$$

Inserting (18) into (17), we obtain $$i_c = \frac{I_o R_1}{R_o}\left[1 - \frac{t}{R_o C_1} - \frac{R_o}{R_1}\left(1 - \frac{t}{R_o C_1} - 1\right)\right] \quad (19)$$

$$= \frac{I_o R_1}{R_o}\left[1 + \left(\frac{1}{R_1 C_1} - \frac{1}{R_o C_1}\right)t\right] \quad (20)$$

Comparing (20) and (4), we have that $$\left. \begin{array}{l} B = \frac{I_o R_1}{R_o} \\ \sigma = \left(\frac{1}{R_1 C_1} - \frac{1}{R_o C_1}\right) \end{array} \right\} \quad (21)$$

For exact initial correction $$\sigma = \frac{1}{T_o} = \frac{1}{R_1 C_1} - \frac{1}{R_o C_1} \quad (22)$$

$$= \frac{R_o - R_1}{R_o R_1 C_1}$$

$$= \frac{R_2}{R_o R_1 C_1} \quad (23)$$

Letting $$R_1 C_1 = T_c \quad (24)$$

$$\frac{1}{T_o} = \frac{R_2}{R_o} \cdot \frac{1}{T_c} \quad (25)$$

$$R_o = R_2 \frac{T_o}{T_c} \quad (26)$$

As $$R_1 = R_o - R_2 \quad (27)$$

$$R_1 = R_2\left[\frac{T_o}{T_c} - 1\right] \quad (28)$$

Figure 14:
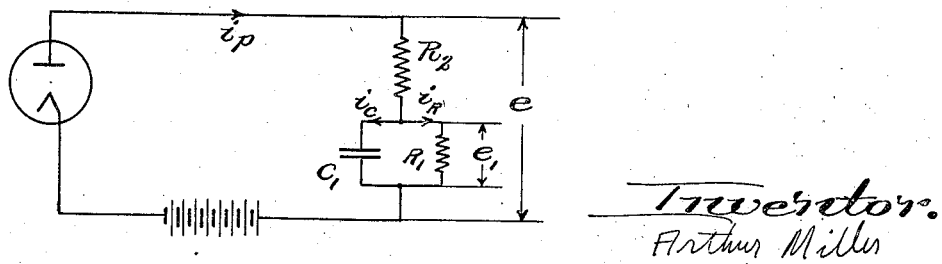

The derivation of the design formulae for one of the alternative networks, such as that illustrated in Fig. 2, will now be given in connection with Fig. 14.

The internal impedance of the tube is supposed to be high compared to $R_2$, so that it may be considered to act as a constant-current device. $i_p$ is a constant current of amplitude $I_o$ impressed at $t=0$.

$$i_R = i_p - i_c \quad (29)$$

$$e_1 = \frac{1}{C}\int i_c dt = (i_p - i_c)R_1 \quad (30)$$

$$= i_p R_1 - i_c R_1$$

Transforming (30)

$$\frac{I_c}{SC_1} = \frac{I_o}{S} R_1 - I_c R_1 \quad (31)$$

$$I_c = I_o \frac{1}{S + \frac{1}{R_1 C_1}} \quad (32)$$

Inverting, $$i_c = I_o \epsilon^{-\frac{t}{R_1 C_1}} \quad (33)$$

$$i_R = I_o\left(1 - \epsilon^{-\frac{t}{R_1 C_1}}\right) \quad (34)$$

$$e_1 = R_1 i_R = I_o R_1\left(1 - \epsilon^{-\frac{t}{R_1 C_1}}\right) \quad (35)$$

$$e = I_o R_2 + e_1$$

$$= I_o R_2 + I_o R_1\left(1 - \epsilon^{-\frac{t}{R_1 C_1}}\right) \quad (36)$$

$$e = I_o R_2\left[1 + \frac{R_1}{R_2}\left(1 - \epsilon^{-\frac{t}{R_1 C_1}}\right)\right] \quad (37)$$

For small $t$, $$\epsilon^{-\frac{t}{R_1 C_1}} = 1 - \frac{t}{R_1 C_1} \quad (38)$$

$$e = I_o R_2\left[1 + \frac{R_1}{R_2}\left(1 - 1 + \frac{t}{R_1 C_1}\right)\right]$$

$$= I_o R_2\left[1 + \frac{1}{R_2 C_1} t\right] \quad (39)$$

Compare (39) and (4).

$$\sigma = \frac{1}{R_2 C_1} \quad (40)$$

$$\frac{1}{R_2 C_1} = \frac{1}{T_o} \quad (41)$$

$$T_c = R_1 C_1 \quad (42)$$

Equations 41 and 42 determine the design of the network with the exception of the choice of $R_2$. This naturally depends upon the tube used and the gain required of the stage.

The following analysis shows the actual response obtained when using the corrective network of Fig. 1. When a constant voltage is impressed on the input of the amplifier at $t=0$, then the voltage appearing at the grid of the output stage will be a decaying voltage which, for a short time compared to $T_o$, can be expressed as $$E_c \epsilon^{-\frac{t}{T_o}}$$

The plate current $i_p$ will be given by:

$$i_p = I_o \epsilon^{-\frac{t}{T_o}} \quad (43)$$

Transforming, $$I_p = I_o \frac{1}{S + \frac{1}{T_o}} \quad (44)$$

Substituting in (10), $$R_2 I_c = \left[\frac{I_o}{S + \frac{1}{T_o}} - I_c\right]\left[R_1 + \frac{1}{C_1 S}\right] \quad (45)$$

$$I_c = \frac{I_o}{S + \frac{1}{T_o}} \cdot \frac{R_1 + \frac{1}{C_1 S}}{R_o + \frac{1}{C_1 S}}$$

$$= \frac{I_o}{R_o C_1} \cdot \frac{1}{\left(S + \frac{1}{T_o}\right)\left(S + \frac{1}{R_o C_1}\right)} +$$

$$\frac{I_o R_1}{R_o} \cdot \frac{S}{\left(S + \frac{1}{T_o}\right)\left(S + \frac{1}{R_o C_1}\right)} \quad (46)$$

Inverting (46), $$i_o = \frac{I_o}{R_o C_1}\left[\frac{\epsilon^{-\frac{t}{T_o}} - \epsilon^{-\frac{t}{R_o C_1}}}{\frac{1}{R_o C_1} - \frac{1}{T_o}}\right] +$$

$$\frac{I_o R_1}{R_o}\left[\frac{\frac{1}{R_o C_1}\epsilon^{-\frac{t}{R_o C_1}} - \frac{1}{T_o}\epsilon^{-\frac{t}{T_o}}}{\frac{1}{R_o C_1} - \frac{1}{T_o}}\right] \quad (47)$$

Let $$\frac{1}{T_o} = \alpha, \quad \frac{1}{R_o C_1} = \beta \quad (48)$$

$$i_o = \frac{I_o R_1}{R_o}\frac{1}{\beta-\alpha}\left[\epsilon^{-\alpha t}\left(\frac{\beta R_o}{R_1} - \alpha\right) - \beta\epsilon^{-\beta t}\left(\frac{R_o}{R_1} - 1\right)\right] \quad (49)$$

For $t$ small compared to $$\frac{1}{\beta}$$

$$\epsilon^{-\beta t} = 1 - \beta t$$
$$\epsilon^{-\alpha t} = 1 - \alpha t \quad (50)$$

$$i_o = \frac{I_o R_1}{R_o(\beta-\alpha)}$$

$$\left[(1-\alpha t)\left(\frac{\beta R_o}{R_1} - \alpha\right) - \beta(1-\beta t)\left(\frac{R_o}{R_1} - 1\right)\right] \quad (51)$$

$$i_o = \frac{I_o R_1}{R_o}\left[1 - \left\{\alpha - \beta\left(\frac{R_o}{R_1} - 1\right)\right\}t\right] \quad (52)$$

For no initial decay, the term containing $t$ must be zero, that is, $$\alpha - \beta\left(\frac{R_o}{R_1} - 1\right) = 0 \quad (53)$$

$$\alpha = \beta\left(\frac{R_o}{R_1} - 1\right) \quad (54)$$

$$\frac{1}{T_o} = \frac{1}{R_o C_1}\left(\frac{R_o}{R_1} - 1\right)$$

$$= \frac{1}{R_1 C_1} - \frac{1}{R_o C_1} \quad (55)$$

Equation 55 is identical with 22 which was previously derived from the basis principle of the invention that is expressed in Equations 3, 4 and 5.

Equation 49 applies for a time interval short compared to $T_o$, and so can be used to evaluate the actual decay of the deflection for a few tenths of a second after the constant voltage is applied. For a specific example take $t = .1$ second, and the circuit constants given above.

$$i_o = I_o \times \frac{10000}{12000} \times \frac{1}{3.33 - .67}$$

$$\left[\epsilon^{-.067}\left(\frac{3.33 \times 12000}{10000} - .67\right) - 3.33\epsilon^{-.333}\left(\frac{12000}{10000} - 1\right)\right]$$

$$= I_o \times \frac{10000}{12000} \times \frac{2.63}{2.67}$$

$$= .985 \times \frac{I_o \times 10000}{12000} \quad (56)$$

The initial deflection is $$I_o \times \frac{10000}{12000}$$

so that, at the end of .1 second, the deflection has decayed to 98.5 percent of its original value, or the drop is 1.5 percent. Without the corrective network this decay would have been given by the factor $$\epsilon^{-\frac{t}{T_o}}. \text{ For } \frac{1}{T_o} = .67 \text{ and } t = .1 \text{ sec.}$$

the deflection would have dropped 7 percent as compared with 1.5 percent for the corrected circuit. If no corrective network is used and similar results are desired, then the time constant of the amplifier would have to be 6.7 secs. as compared to 1.5 seconds for the corrected circuit.

In these calculations the important equations are numbered 3, 4, 5, 8, 17, 18, 20, 21, 23, 24, 28, 30, 35, 39, 40, 41, 42, 43, 48, 49, 50, 52, 53, 55, 56.

Equations 3, 4 and 5 express the principle of the invention.

Equation 8 is the differential equation for the corrective network of Fig. 3.

Equation 17 is the solution of Equation 8.

Equation 18 expresses the exponential of small $t$.

Equation 20 applies the approximation of Equation 18 to Equation 17 so as to put Equation 20 in the form of Equation 4.

Equation 21 brings out the similarity of Equations 20 and 4.

Equation 22 applies the principle of Equation 5 to the network.

Equations 24 and 28 are the design formulae for the corrective network of Fig. 3, resulting from Equation 22.

Equation 30 is the differential equation for the corrective network of Fig. 4.

Equation 35 is the solution of Equation 30.

Equation 39 expresses Equation 35 in the required form of Equation 4 and is valid for a short time interval only.

Equations 40, 41 and 42 are the design formulae for this network.

Equation 43 expresses the decaying current flowing in the plate circuit of the last tube of Fig. 1, when a constant voltage is impressed at the input of the amplifier.

Equation 48 defines the factors $\alpha$ and $\beta$ in terms of which the later work is written.

Equation 49 is the expression for the galvanometer current as a function of time. It is valid for a time small compared to $T_o$.

Equation 50 introduces the approximate expressions for the exponentials which are valid for $t$ small compared to $$\frac{1}{\beta}$$

Equation 52 is an approximation for the galvanometer current, valid for a time short compared to $T_o$. This is derived from (49) by use of (50).

Equation 53 expresses the condition that the galvanometer current be independent of time, that is, constant.

Equation 55 expresses the relationships which must exist among the network parameters in order to satisfy (53).

Equation 56 gives the actual galvanometer current .1 second after the application of the constant voltage to the given amplifier and corrective network.

Further modifications will occur to persons skilled in the art, and all such are considered to fall within the spirit and scope of the invention, as defined in the appended claims.

What is claimed is:

1. A method of correcting the distortion that is produced in oscillographic-recording circuits by the presence therein of a series-coupling condenser or condensers, comprising the introduction of a corrective network which reproduces a suddenly applied constant voltage as a rising voltage whose initial upward slope approximately or exactly equals the initial downward slope with which the circuit to be corrected reproduces the same suddenly applied voltage.

2. In an oscillographic-recording circuit containing series coupling condensers and a recording device, a corrective network comprising a condenser in series with a resistance shunted across the recording device in series-parallel combination, the circuit parameters having values such that the sudden application of a constant current to the series-parallel combination results in an increasing deflection, the rate of increase being equal to the rate of decay of the deflection produced when a constant voltage is applied to the input of the recording circuit without the inclusion of the corrective network.

3. In a recording system containing an amplifier comprising one or more resistance-capacitance-coupled amplifier stages each comprising a vacuum tube having a cathode, a grid and a plate, an input circuit containing the cathode and the grid, and an output circuit containing the cathode and the plate, and a recording device in the output of the last stage, a corrective network comprising a condenser in series with a resistance shunted across one of the said circuits of one or more of the stages for correcting the distortion that is produced by the presence of the coupling condenser or condensers of the resistance-capacitance-coupled amplifier stages, the circuit parameters having values such that the sudden application of a constant voltage to the input of the amplifier results in a deflection of the said recording device whose initial decay is zero.

4. In an electric system comprising an output circuit having a resistance $R_2$, fed from a source the internal resistance of which is large compared with $R_2$, a corrective network comprising a resistance $R_1$ and a condenser $C_1$ series-connected in parallel to the resistance $R_2$, and having the values $$R_1 = R_2\left(\frac{T_e}{T_o} - 1\right)$$

$$C_1 = \frac{T_e}{R_1}$$

where $T_e$ is the time constant of the corrective network, and $T_o$ is the time constant of the system before correction.

5. In a resistance-capacitance-coupled amplifier the output circuit of the output amplifier stage of which has a resistance $R_2$ small compared with the internal resistance of the amplifier stage, a corrective network comprising a resistance $R_1$ and a condenser $C_1$ series-connected in parallel to the resistance $R_2$, and having the values $$R_1 = R_2\left(\frac{T_e}{T_o} - 1\right)$$

$$C_1 = \frac{T_e}{R_1}$$

where $T_e$ is the time constant of the corrective network, and $T_o$ is the time constant of the amplifier.

6. In an electric system, a circuit having a corrective network comprising resistances $R_1$ and $R_2$ and a condenser $C_1$ in parallel to the resistance $R_1$, fed from a source the internal resistance of which is large compared with $R_2$, and having the values $$\frac{1}{R_1 C_1} = \frac{1}{T_o}$$

$$T_e = R_1 C_1$$

where $T_e$ is the time constant of the corrective network, and $T_o$ is the time constant of the system before correction.

7. In a resistance-capacitance-coupled amplifier having a corrective network comprising resistances $R_1$ and $R_2$ and a condenser $C_1$ in parallel to the resistance $R_1$, fed from a tube the internal plate resistance of which is large compared with $R_2$, and having the values $$\frac{1}{R_1 C_1} = \frac{1}{T_o}$$

$$T_e = R_1 C_1$$

where $T_e$ is the time constant of the corrective network, and $T_o$ is the time constant of the amplifier before correction.

8. An electrocardiograph having, in combination, an amplifier comprising a plurality of resistance-capacitance-coupled amplifier stages, each comprising a vacuum tube having a cathode, a grid and a plate, an input circuit containing the cathode and the grid and an output circuit containing the cathode and the plate, the amplifier having one or more series condensers, a plurality of electrodes connected with the input circuit of the first stage and through the medium of which the electrical impulses associated with cardiac activity may be impressed upon the said input circuit of the said first stage, an indicating device in the output circuit of the last stage and to which the said electrical impulses are adapted to be transmitted after amplification by the amplifier, and a corrective network in one or more of the stages for correcting the distortion that is produced by the presence of the said series condenser or condensers, the circuit parameters having values such that the sudden application of a constant voltage to the input of the system would be reproduced, if the series condensers are assumed infinitely large, as a rising voltage whose initial upward slope approximately or exactly equals the initial downward slope with which the uncorrected electrocardiograph reproduces the same suddenly applied voltage.

9. In an electric circuit containing one or more series-coupling condensers and a load, a corrective network comprising a condenser in series with a resistance shunted across the load in series-parallel combination, the circuit parameters having values such that the sudden application of a constant current to the series-parallel combination results in an increasing voltage across the load, the rate of increase being equal to the rate of decay of the voltage across the load produced when a constant voltage is applied to the input of the said electric circuit without the inclusion of the corrective network.

10. An electrocardiograph having, in combination, an amplifier comprising a plurality of resistance-capacitance-coupled amplifier stages each comprising a vacuum tube having a cathode, a grid and a plate, an input circuit containing the cathode and the grid and an output circuit containing the cathode and the plate, the amplifier having one or more series condensers and one or more resistors between adjacently disposed stages, a plurality of electrodes connected with the input circuit of the first stage and through the medium of which the electrical impulses associated with cardiac activity may be impressed upon the said input circuit of the said first stage, an indicating device in the output circuit of the last stage and to which the said electrical impulses are adapted to be transmitted after amplification by the amplifier and a corrective network in one or more of the stages in series with one or more of the said resistors for correcting the distortion that is produced by the presence of the said series condenser or condensers, the network comprising a resistor in parallel with a condenser and having circuit parameters of value such that the sudden application of a constant voltage to the input of the amplifier results in a deflection of the said indicating device whose initial decay is zero.

11. In a recording system containing an amplifier comprising one or more resistance-capacitance-coupled amplifier stages each comprising a vacuum tube having a cathode, a grid and a plate, a grid-cathode impedance for each stage, a plate-cathode impedance for each stage, an input circuit containing the cathode, the grid and the corresponding grid-cathode impedance, an output circuit containing the cathode, the plate, and the corresponding plate-cathode impedance, and a recording device in the output of the last stage, a corrective network comprising a condenser shunted across a portion of one of the impedances of one or more of the stages for correcting the distortion introduced by the coupling condenser or condensers of the resistance-capacitance-coupled amplifier stages, the circuit parameters having values such that the sudden application of a constant voltage to the input of the amplifier results in a deflection of the said recording device whose initial decay is zero.

ARTHUR MILLER.